United States Patent [19]

Julien et al.

[11] Patent Number: 5,013,507
[45] Date of Patent: May 7, 1991

[54] METHOD FOR PRODUCING AN ELONGATE PASSAGE WITHIN A COMPONENT

[75] Inventors: Gerald J. Julien, Puyallup; Steven P. Robinson; Ronald H. Bondy, both of Seattle, all of Wash.

[73] Assignee: The Boeing Company, Seattle, Wash.

[21] Appl. No.: 415,898

[22] Filed: Sep. 29, 1989

[51] Int. Cl.⁵ .................. B29C 39/10; B29C 41/20; B29C 41/42
[52] U.S. Cl. .................................. 264/219; 264/257; 264/317; 264/279.1; 156/155
[58] Field of Search ............... 264/317, 221, 248, 249, 264/275, 276, 277, 278, 279, 279.1, 313, 257, 219; 156/155

[56] References Cited

U.S. PATENT DOCUMENTS

| 3,630,799 | 12/1971 | Crimmins | 156/155 |
| 4,361,533 | 11/1982 | Jenks | 264/258 |
| 4,675,061 | 6/1987 | Mead | 156/155 |

FOREIGN PATENT DOCUMENTS

| 61-76351 | 4/1985 | Japan . |
| 61-180817 | 9/1985 | Japan . |
| 60-260318 | 12/1985 | Japan . |

Primary Examiner—Jay H. Woo
Assistant Examiner—Jeremiah F. Durkin
Attorney, Agent, or Firm—Christensen, O'Connor, Johnson & Kindness

[57] ABSTRACT

A method for creating an elongate passage of a desired cross-sectional shape and size within a component. A shape memory metal alloy is formed into an elongate element, such as a wire (16), having the cross-sectional shape and size desired of the elongate passage. The wire is embedded within a component (10) as the component is manufactured, e.g., by laying-up the component from a fiber/resin composite and curing it, or by casting the component in a mold (50) from a liquid that hardens around the memory metal alloy, embedding it in place. The liquid may comprise glass, ceramic, thermoplastic, or metal having a lower melting point than the memory metal alloy. The wire is then pulled from the component, by applying a force sufficient to convert the memory metal alloy from a soft martensitic state to a stress-induced martensitic state, thereby plastically and inelastically deforming it so that it lengthens. As the memory metal alloy wire lengthens, its cross-sectional area decreases. In addition, conversion of the memory metal alloy to its stress-induced martensitic state increases its tensile strength, preventing it from being broken by the applied force. Due to the decrease in the diameter of the wire and its increase in tensile strength, it is easily pulled free from the component, leaving behind a void having substantially the same cross-sectional shape and size as the wire.

23 Claims, 3 Drawing Sheets

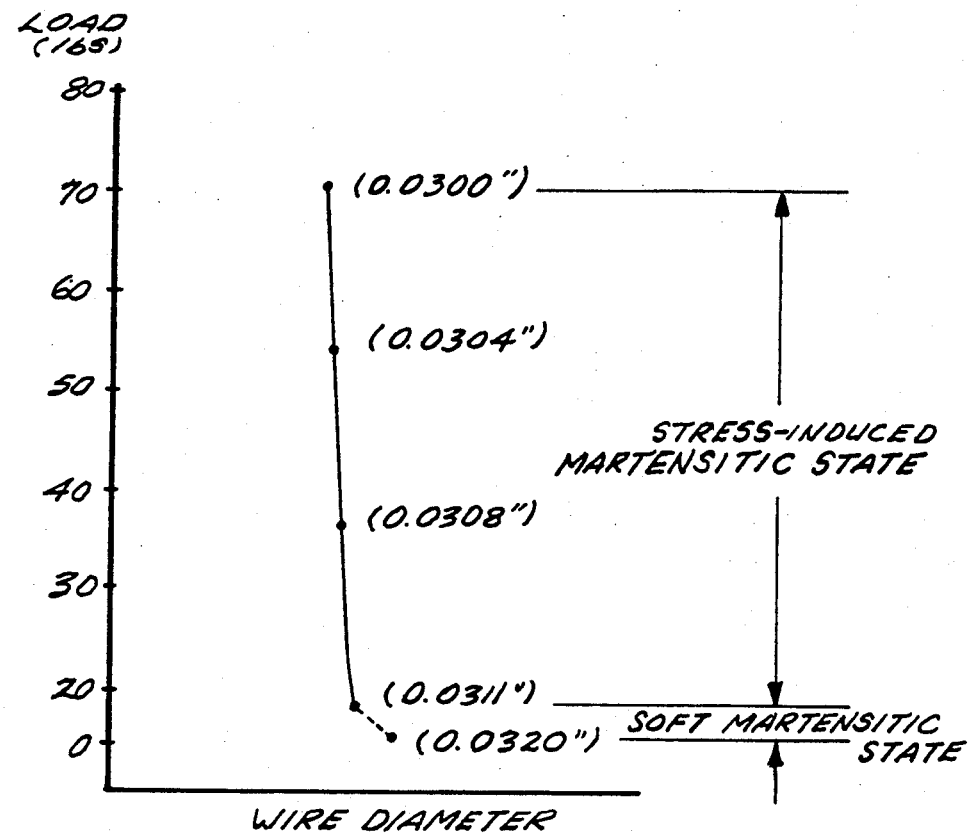
fig. 4.
fig. 5.
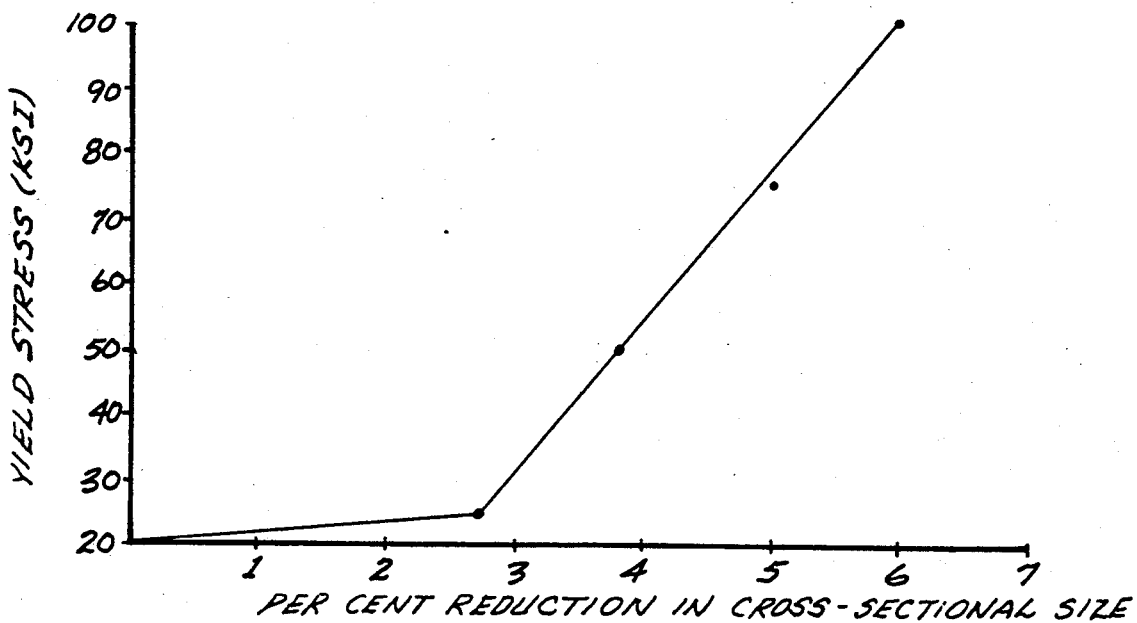

METHOD FOR PRODUCING AN ELONGATE PASSAGE WITHIN A COMPONENT

TECHNICAL FIELD

This invention generally pertains to a method for producing an elongate cavity within a component, specifically, by forming the component around an element that is subsequently withdrawn from the component, leaving a void comprising the cavity.

BACKGROUND OF THE INVENTION

Innumerable techniques exist for producing cavities in materials, most involving some mechanism for melting, abrading, etching, or machining the material, or molding it so as to form a cavity in a desired shape and position. However, producing an extremely long, narrow cavity or passage within a component, e.g., a cavity having a cross-sectional dimension that is less than a millimeter and a length measured in meters, represents a much more difficult task for which a solution has not previously been available. Clearly, conventional techniques for forming an elongate cavity using a drill or an energy beam to vaporize the material are useless in producing a cavity with such dimensions.

A partial solution to the problem seems to be disclosed in U.S. Pat. No. 3,630,799. This patent teaches a method for forming a plurality of spaced-apart passages within a supporting medium. According to this method, a laminate structure is formed with a plurality of wires embedded within it, positioned where the elongate passages are desired. The wires are removed from the laminate by subjecting them to a pulling force, which causes elongation of the wires and decreases their overall diameter, purportedly freeing them so that they are easily removed from the laminate. Not disclosed in the patent is the type of material from which the wires are made, or any limitations on the diameter or length of the elongate passages that can be formed using this technique. However, it is likely that the technique is limited to forming passages much less than a meter in length. Conventional metal wire is subject to work hardening as it is plastically deformed by stretching it lengthwise. As the wire stretches, it thus becomes brittle and breaks when the frictional drag developed between the material in which it is embedded and the wire increases beyond the tensile strength of the wire.

In U.S. Pat. No. 4,361,533, a related method is used to mold a fiberglass tennis racket frame having two elongate cavities formed within it. The frame is constructed from two small diameter fiberglass tubes formed by rolling fiberglass strips around elongate silicone rubber slugs, which are approximately six millimeters in diameter and about 64 centimeters in length. The small diameter fiberglass tubes are inserted into a larger diameter fiberglass cylinder, and the larger cylinder is pinched around and between the tubes to form a tube having a figure-8 cross-sectional shape. The component is then placed into a curing mold and heated, causing the silicone rubber to expand, so that it pushes the surrounding fiberglass into contact with the mold. Once the molded frame has cooled, the silicone rubber slugs are withdrawn by pulling on them lengthwise, thereby reducing their diameter so that they self-free from the cured frame.

Both of the prior art techniques discussed above offer only a partial solution to the problem initially posed. As is often the case in technology involving the fabrication of components, both methods are capable of forming elongate cavities of only limited length and relatively large cross section. The limitations are matters of degree. Clearly, neither conventional wire nor silicone rubber slugs can be successfully employed as taught by the references, to form passages that are less than a millimeter in diameter and several meters in length, because conventional wire material and silicone rubber of such small diameter and length would break before being pulled free of a component.

A different technique for forming elongate cavities in a component is taught in U.S. Pat. No. 4,675,061. This technique relies upon an unusual characteristic of a class of metal alloys referred to as shape memory metals. Such metal alloys revert to a memory shape when heated above a critical temperature, causing them to change from a martensitic state to an austenitic state. The patent shows how hollow tubular, trapezoidally-shaped cores of memory metal alloy can be molded between a planar base layer and an overlying layer of fiberglass or other type of composite. The assembly is then autoclaved under pressure, bonding the overlying layer to the base layer and curing a resin contained within the composite material. To remove the memory metal cores, the autoclave temperature is adjusted to heat the cores above the critical temperature of the memory metal, converting it to the austenitic state. In the austenitic state, the memory metal resumes its memory shape, wherein the cores contract to a smaller cross-sectional area. The smaller cross-sectional hollow cores are then easily removed, leaving behind an elongate void having a trapezoidal cross section. This technique is limited by the need to use hollow memory metal cores. The memory metal cores must be hollow to permit a reduction in their cross-sectional area when they revert to the memory shape. As a result, the technique has little application for forming passages of the required smaller cross section noted above.

Accordingly, it is an object of the present invention to form an elongate cavity within a component, where the cavity is of substantially greater length than possible with prior art methods. A further object is to form an elongate passage of a relatively small cross-sectional area, e.g., less than a millimeter in diameter. Yet a further object is to form cavities of a desired cross-sectional shape within a material. These and other objects and advantages of the present invention will be apparent from the attached drawings and from the Disclosure of the Preferred Embodiments that follows.

SUMMARY OF THE INVENTION

As defined in the claims, the present invention is a method for creating an elongate cavity of a desired cross-sectional shape and size within a component. The method includes the step of forming a memory metal alloy into an elongate element having substantially the same cross-sectional shape and size as that desired of the elongate cavity. The component is fabricated with the elongate element positioned where the elongate cavity is desired, so that the component conforms around the cross-sectional shape of the elongate element, along a substantial portion of its length. A force is then applied to axially pull the elongate element from the component. The force is of sufficient magnitude to convert the memory metal alloy into a stress-induced martensitic state. In changing to the stress-induced martensitic state, the elongate element experiences a plastic, inelastic deformation as it stretches axially in length. In addition, the tensile strength of the elongate element substantially increases, and the cross-sectional area of the elongate element substantially decreases. Due to the decrease in cross-sectional area and increase in tensile strength, the elongate element is freed from the component and readily withdrawn without fracture or breakage. The elongate cavity within the component thus comprises the space previously occupied by the elongate element, after the element is pulled free from the component.

The method can further include the step of annealing the memory metal alloy prior to positioning it within the component, thereby converting the alloy substantially to a martensitic state. Alternatively, where the step of fabricating the component includes the step of heating the component and the elongate element positioned therein, the step of heating can also comprise the steps of annealing and converting the memory metal alloy to a martensitic state.

The method may be applied to components comprising a variety of materials. Where the component comprises a composite fiber/resin material, the step of fabricating the component comprises the steps of forming fibers impregnated with resin about the elongate element and curing the formed composite fiber/resin material. The step of fabricating can also comprise the steps of flowing a liquid material around the elongate element within a mold, and hardening the liquid material into a solid.

The step of axially pulling on the elongate element can cause the tensile strength of the memory metal alloy to at least double, so that the elongate element is not broken by the applied force necessary to pull it from the component. Where the elongate element includes two ends that extend from the component, opposed forces can be applied to the opposite ends to convert it to the stress-induced martensitic state without loading the component. Preferably, the memory metal alloy comprises a nitinol alloy.

BRIEF DESCRIPTION OF THE DRAWINGS

FIG. 4 is a graph showing the relationship between wire diameter and load-to-yield for a nitinol memory metal alloy wire; and FIG. 5 is a graph illustrating the relationship between cross-sectional area and yield stress (in KSI) for a nitinol memory metal alloy element.

DESCRIPTION OF THE PREFERRED EMBODIMENTS

Figure 1:
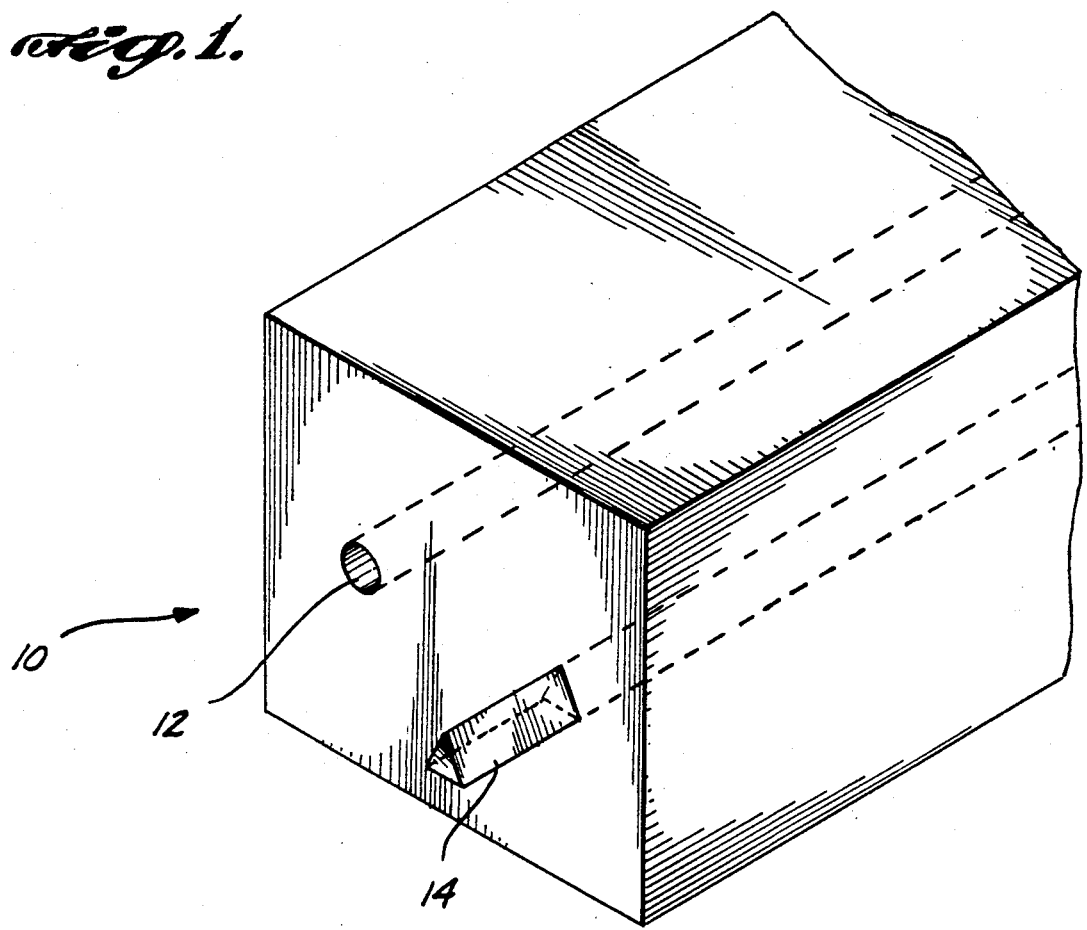
FIG. 1 is an isometric view of a portion of a composite fiber/resin component in which a round cross-sectional hole has been formed by the present method.

With reference to FIG. 1, a portion of a component 10 is shown, in which a relatively small diameter passage 12 extends longitudinally. Passage 12 is formed using the method described below. While not limited to any specific dimension, passage 12 is uniform in cross-sectional dimension, can have a diameter less than one millimeter, and can extend at least several meters in length.

It is contemplated that component 10 may comprise a variety of materials, including but not limited to: a composite of fiberglass/resin, graphite/resin, or boron/resin; a metal-fiber/resin matrix; glass; ceramic; plastic; or virtually any structural material that can be formed as a component with an elongate element embedded therein. This definition is intended to be very broad. Component 10 may also include materials such as metals that can be melted and cast with the elongate element in place; however, such materials must have a melting point that is less than the melting point of a memory metal alloy comprising the element that is embedded within component 10.

The elongate passage formed within component 10 using the method comprising the present invention is not limited to a round cross section; virtually any cross-sectional shape passage may thus be formed. For example, the triangular cross-sectional shape of a memory metal alloy elongate element 14, which is embedded within component 10 generally parallel to elongate passage 12 is used to form a corresponding triangular passage within the component. When elongate element 14 is withdrawn from component 10, it will leave behind an elongate triangular cross section cavity or passage through component 10 that has the same cross-sectional shape and dimensions as elongate element 14. To achieve a cavity having a desired cross-sectional shape and size, the elongate element embedded in the component must be drawn or otherwise formed in that shape and size prior to its embedment in the component. Cavities or passages formed within a component in accordance with the present invention are free from any machining marks and residual debris that typically remains after conventional techniques, such as drilling or burning a passage with a laser beam, are employed. In addition, conventional techniques are limited in use to forming much shorter length passages.

The method used to embed a memory metal alloy element such as triangular-shaped element 14 within component 10 depends upon the material comprising the component. If component 10 comprises a composite material, it is likely to be fabricated using conventional lay-up techniques that are typically employed to form components from resin impregnated fiberglass, graphite, or other non-metallic fibers. A bed of cloth fiber prepregged with resin is prepared, and the memory metal alloy element is positioned on the bed where the cavity is to be formed within the component. Additional prepregged cloth fibers are then applied around and overlying the memory metal alloy element, embedding it within the component. Resin in the cloth fibers flows around the memory metal alloy element between the fiberglass or other fiber constituent of the composite as pressure and heat are applied to form the component and cure it. With the application of pressure, the fiber/resin composite conforms to the cross-sectional shape of the shape memory metal alloy element, so that after the composite is cured and hardened, it is generally in intimate contact with the memory metal alloy element along the entire embedded length of the element.

While other memory metal alloys are known and can be used in this application, the memory metal alloy element preferably comprises a nitinol alloy or a doped nitinol alloy. Nitinol is particularly suited for this purpose, because it is corrosion resistant and does not readily adhere to other materials that are likely to be used to form the composite in which the nitinol is embedded. For example, fiberglass/resin and other composites can be formed in intimate contact with nitinol without adhering to it. Similarly, most plastics, refractory materials, and metals do not adhere to nitinol, even when melted and molded around it.

Figure 3:
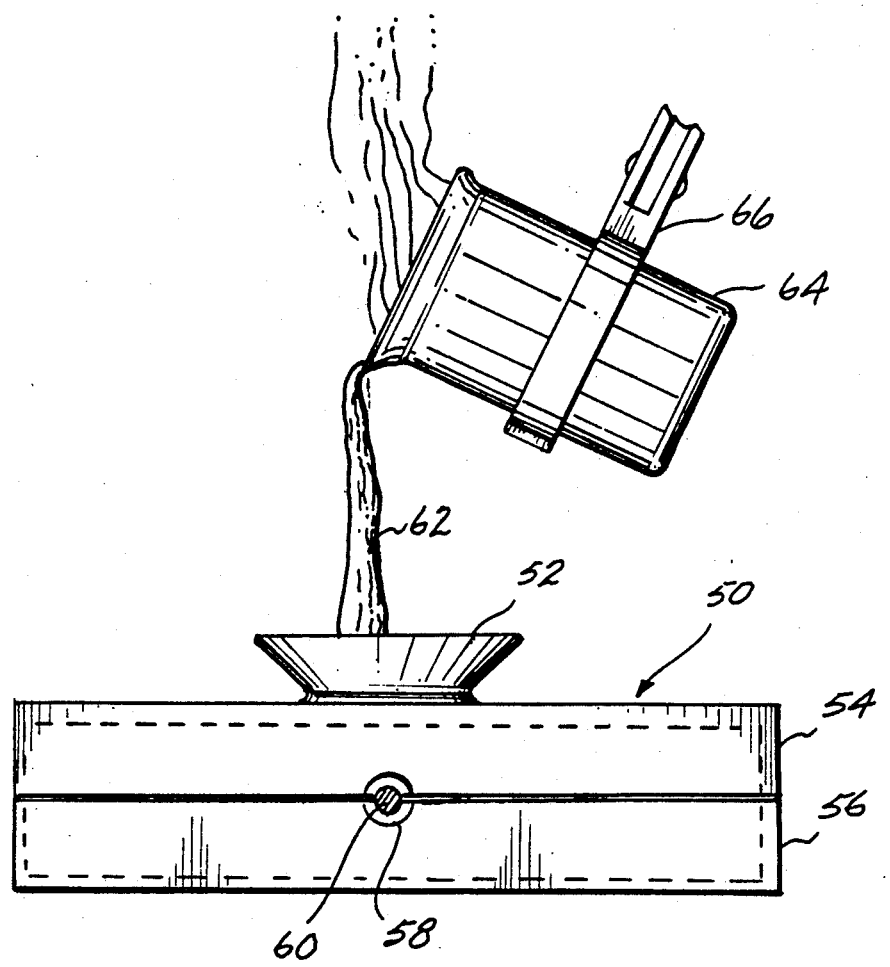
FIG. 3 is an elevational view illustrating the molded fabrication of a component from a liquid, wherein a memory metal alloy wire is embedded in the molded component.

In FIG. 3, a mold 50 is shown for casting an elongate component in which a nitinol wire 60 is centrally disposed, extending generally along the longitudinal axis of the component. Mold 50 comprises a top portion 54 and a bottom portion 56. On the upper surface of top portion 54 is disposed a filler spout 52 through which liquid material is introduced into the mold. An orifice 58 is centrally disposed at one end of mold 50, between top and bottom portions 54 and 56, and a nitinol (or other memory metal alloy) wire is positioned within orifice 58 so that it extends outside the mold at least at one end. A stream 62 of molten metal or other material having a melting point less than the memory metal alloy used (approximately 1,300° C. for nitinol) is poured through filler spout 52 from a crucible 64 supported by tongs 66. Other materials such as molten thermoplastic, ceramic, or glass may also be introduced into mold 50 to form a component in which an elongate passage is to be made using this technique. The molten material is allowed to cool and solidify, embedding nitinol wire 60 in place within the resulting component. Mold 50 is then separated into its top and bottom portions 54 and 56, freeing the component. It will be apparent that if component 10 were not laid-up using a composite, it could alternately be molded using the technique just described, or formed by injection molding, vacuum molding, or by using other molding/casting techniques well known in the art.

Figure 2:
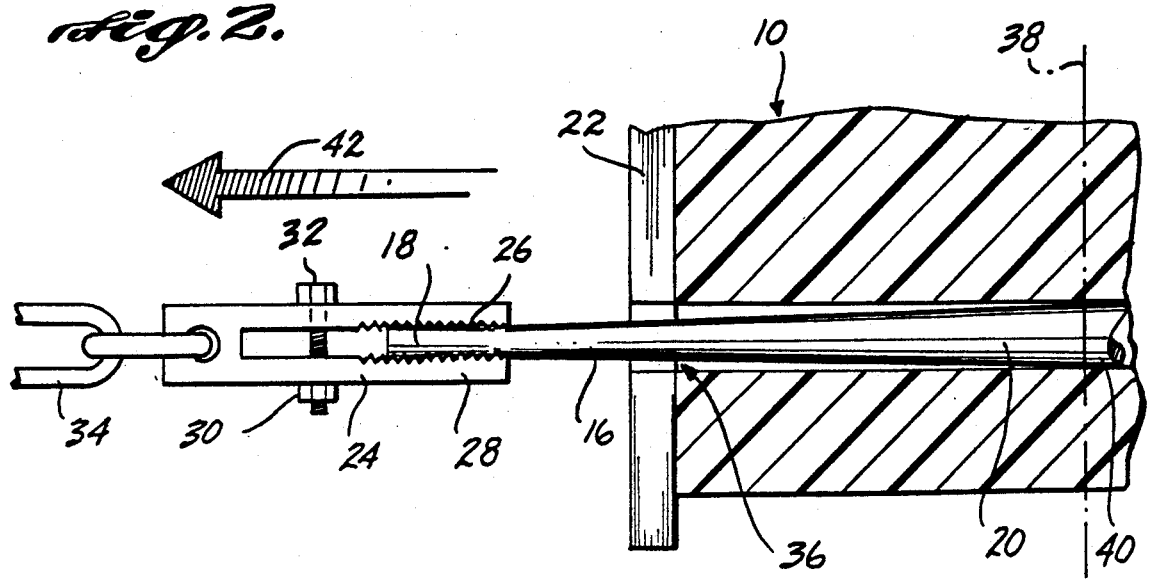
FIG. 2 is a plan view of a portion of a component, illustrating the formation of an elongate hole therein by pulling an embedded memory metal alloy wire from the component.

Turning to FIG. 2, a portion of component 10 is shown prior to the creation of elongate passage 12. Passage 12 is formed by pulling a memory metal wire 16 from the component, leaving behind a void that comprises the passage. An end 18 of memory metal alloy wire 16 extends from component 10 and is engaged between opposed serrated jaws 26 and 28 that comprise a clamp 24. Serrated jaws 26 and 28 are compressibly clamped over end 18 by tightening a nut 30 on a bolt 32 that extends between the two serrated jaws. A chain 34 is attached to clamp 24 and is connected to a coffin-hoist, winch or other mechanism (not shown) suitable for providing a pulling force generally aligned with the longitudinal axis of shape memory metal alloy wire 16. Component 10 is prevented from moving in the direction of the applied force by a ridge 22, which is attached to the underlying surface on which component 10 rests, and which engages the front edge of component 10. Force could also be applied to move component 10 relative to the wire, which would then be held in a fixed clamp 24. Alternatively, if opposite ends of memory metal alloy wire 16 extend from the component force can simultaneously be applied in opposite directions to both ends of the memory metal alloy wire, thereby eliminating any adverse loading of the component. The force can be applied to each end of the memory metal alloy wire, as shown in FIG. 2, but in opposite directions. Component 10 need not then be restrained, since no load is applied to it.

As force is applied to end 18 in the direction indicated by an arrow 42 (or in opposite directions to both ends of the wire), memory metal alloy wire 16 is plastically deformed. Its diameter decreases as it elongates due to the inelastic deformation caused by the applied stress. Unlike conventional wire, however, memory metal alloy wire 16 experiences an increase in tensile strength as it is plastically deformed. The plastic deformation converts the memory metal alloy from a soft martensitic state to a stronger stress-induced martensitic state. Prior to the application of stress, in its martensitic state, memory metal alloy wire 16 typically has a tensile yield strength of approximately 20 KSI. As stress is applied, its tensile strength increases, reaching a yield strength of 70–80 KSI or higher. This dramatic increase in tensile strength greatly increases the resistance of the memory metal alloy wire to breakage as it is pulled from component 10. The amount of strain nitinol is capable of sustaining before breakage is greater than 20%. This characteristic is reflected in the significant reduction in cross-sectional area of the material under stress.

The point at which memory metal alloy wire 16 begins to experience plastic deformation travels longitudinally along the wire in an opposite direction, as stress is applied in the direction of arrow 42. If opposed stress is applied to both ends of the wire, points of elastic deformation advance from the ends along the longitudinal axis of the wire, until the points meet, approximately at mid-length of the wire. In FIG. 2, a dash line 38 indicates the approximate current position of plastic deformation along the longitudinal axis of the wire. A portion 20 of the memory metal alloy wire on the left side of dash line 38 has experienced a reduction in diameter and an elongation, with concurrent increase in tensile strength, while on the other side of dash line 38, a portion 40 of the shape memory metal alloy wire remains in the relatively softer martensitic state. As force is continuously applied to memory metal alloy wire 16, line 38 continues to move toward the right with respect to the configuration illustrated in FIG. 2, until substantially the entire embedded length of memory metal alloy wire 16 has been converted to the martensitic stress-induced state, and the wire is pulled free from component 10. The reduction in diameter experienced by the memory metal alloy wire indicated at reference numeral 36 and its increase in tensile strength permit the wire to be readily withdrawn from component 10, almost without regard for the length of the wire that is embedded within component 10.

It is important to note that the method of forming elongate cavities does not depend on the shape memory characteristics of the memory metal alloy. At no time during the practice of this method is the memory metal alloy converted to its shape memory austenitic state. The procedure for forming an elongate passage within a component, such as component 10, by pulling a memory metal alloy element from the component is substantially the same regardless of whether the memory metal alloy element is embedded in a composite as it is laid-up or otherwise formed, or is molded/cast in place within the component, as liquid comprising the component hardens around the memory metal alloy element.

Prior to pulling memory metal alloy wire 16 from component 10, the memory metal alloy must be annealed, so that it is in a soft martensitic state. Nitinol memory metal alloy is annealed to the martensitic state by heating it to a temperature of from 450° C. to 1000° C., depending upon the particular type of annealing process employed. The memory metal alloy can be annealed either prior to its placement and embedment within a component that is being fabricated, or alternatively, can be annealed during the fabrication of the component, if the fabrication process involves heating of the component or the material comprising it above the required annealing temperature. For example, some thermoplastics that may be used to fabricate a component such as component 10, melt at temperatures ranging from approximately 300° C. to 450° C. At the upper end of this range, a nitinol alloy positioned within a mold into which the molten plastic is poured or injected would be heated by the hot plastic sufficiently to anneal the memory metal alloy. When cool, the nitinol converts to the soft martensitic state. Fabricating component 10 from a metal matrix such as aluminum/graphite (which requires a processing temperature of approximately 540° C.) or titanium/graphite (which is processed at approximately 1000° C.) also can simultaneously anneal the memory metal alloy to its soft martensitic state, due to heat transfer from the material to the memory metal alloy. Similarly, refractory materials and metals that melt at even higher temperatures, but below the melting point of the memory metal alloy, permit the annealing process to be carried out during the molding or casting of the component. Alternatively, fabrication of the component from a material that must be cured at an elevated temperature can serve to anneal the memory metal alloy.

FIG. 4 graphically illustrates the relationship between wire diameter and an applied load for a nitinol alloy wire. Before stress is applied, the nitinol wire is in its soft martensitic state and has a diameter of 0.032 inches. The greatest percentage rate of change in the diameter occurs as force is initially applied to the nitinol wire, but thereafter, the change in diameter is relatively linear as a function of load.

In FIG. 5, the relationship between yield stress (in KSI) and the cross-sectional size (e.g., wire diameter) of a nitinol element is graphically illustrated. From an initial yield stress of 20 KSI for soft martensitic nitinol, the yield stress increases only slightly as the cross-sectional size of the nitinol element decreases by approximately 2.8 percent. Thereafter, the increase in yield stress is substantially linear at approximately 25 KSI for each percent decrease in cross-sectional size. The points shown on the graph in FIG. 5 correspond to the specified wire diameters identified in FIG. 4.

Although the present invention has been disclosed with respect to preferred embodiments and modifications thereto, those of ordinary skill in the art will appreciate that further modifications may be made to this invention within the scope of the claims that follow. Accordingly, the scope of the invention is to be determined entirely by reference to the claims and not limited by the disclosure.

The embodiments of the invention in which an exclusive property or privilege is claimed are defined as follows:

1. A method for creating an elongate cavity of a desired cross-sectional shape and size within a component, comprising the steps of:
   (a) forming a memory metal alloy into an elongate element having substantially the same cross-sectional shape and size as that desired of the elongate cavity;
   (b) fabricating the component with the elongate element positioned where the elongate cavity is desired, the component conforming around the cross-sectional shape of the elongate element along a substantial portion of the length of the elongate element; and
   (c) axially pulling the elongate element from the component with sufficient force to substantially convert the memory metal alloy into a stress-induced martensitic state, whereby the elongate element experiences:
      i. a plastic, inelastic deformation, wherein it stretches axially in length with a substantial decrease in cross-sectional area; and
      ii. a substantial increase in tensile strength, said decrease in cross-sectional area and increase in tensile strength respectively freeing the elongate element and enabling it to be withdrawn from the component, without breaking; the elongate cavity within the component thus comprising the space previously occupied by the elongate element after it is pulled from the component.

2. The method of claim 1, further comprising the step of annealing the memory metal alloy prior to positioning it within the component, thereby converting the memory metal alloy to a soft martensitic state.

3. The method of claim 1, wherein the step of fabricating the component includes the step of heating a material comprising the component, said step of heating comprising the step of transferring heat to the elongate element from said material, annealing the memory metal alloy, and converting the memory metal alloy to a soft martensitic state when cool.

4. The method of claim 1, wherein the step of fabricating the component comprises the steps of fabricating a component from a fiber reinforced resin by forming fibers impregnated with resin about the elongate element, and curing the formed fiber reinforced resin with the elongate element embedded therein.

5. The method of claim 1, wherein the step of fabricating the component comprises the steps of flowing a liquid material around the elongate element within a mold, and hardening the liquid material into a solid.

6. The method of claim 1, wherein the step of axially pulling on the elongate element more than doubles the tensile strength of the memory metal alloy, preventing the elongate element from being broken by the applied force necessary to pull it from the component.

7. The method of claim 1, wherein the memory metal alloy comprises a nitinol alloy.

8. The method of claim 1, wherein the component comprises a metal having a substantially lower melting point that the memory metal alloy, said step of fabricating the component comprising the steps of casting the component by melting said metal and forming it around the memory metal alloy in a mold.

9. The method of claim 1, wherein the elongate element is positioned within the component so that an end of the elongate element that is pulled extends from the component.

10. The method of claim 1, wherein opposite ends of the elongate element extend from the component and opposed forces are applied to the opposite ends of the elongate element to convert the memory metal alloy to the stress-induced martensitic state so that the elongate element can be pulled from the component.

11. A method for creating an elongate cavity within a material, said elongate cavity having a longitudinal axis and a generally uniform cross-sectional shape along the longitudinal axis, comprising the steps of:
   (a) forming a memory metal alloy, of a type that increases in tensile strength as it is plastically deformed, in the cross-sectional shape and size of the elongate cavity, with two longitudinally disparate ends that are separated by a distance greater than a required length of the elongate cavity;

(b) forming the material about the memory metal alloy, so that the memory metal alloy is disposed within the material, with at least one of the two longitudinally disparate ends of the memory metal alloy extending from the material;

(c) applying a force on at least one of the longitudinally disparate ends of the memory metal alloy, directed generally in alignment with the longitudinal axis of the memory metal alloy, so as to pull the memory metal alloy from the material in which it is disposed, the stress of said force causing a tensile strength associated with the memory metal alloy to greatly increase and the cross-sectional area of the memory metal alloy to substantially decrease, thereby releasing the memory metal alloy from the material as the memory metal alloy plastically and inelastically deforms due to the applied force.

12. The method of claim 11, wherein prior to the application of force, the memory metal alloy is in a martensitic state, and after the force is applied, the memory metal alloy is in a stress-induced martensitic state.

13. The method of claim 11, further comprising the step of annealing the memory metal alloy by heating it to a temperature sufficient to convert it to a soft martensitic state, prior to the step of applying the force.

14. The method of claim 13, wherein the material is heated and transfers heat to the memory metal alloy, the heat service to anneal the memory metal alloy.

15. The method of claim 13, wherein the memory metal alloy is annealed at a temperature within the range 450° C.–1000° C.

16. The method of claim 11, wherein during the step of applying force, the temperature of the memory metal alloy is at all times below a transition temperature at which the memory metal alloy converts to an austenitic state.

17. The method of claim 11, wherein the cross-sectional shape of the memory metal alloy is generally round.

18. The method of claim 11, wherein the cross-sectional shape of the memory metal alloy has a plurality of sides.

19. The method of claim 11, wherein the material comprises a fiber reinforced resin, said fiber being selected from the group consisting of graphite, boron, metal, ceramic, and non-ceramic glass.

20. The method of claim 11, wherein the step of molding comprises the steps of heating the material to liquefy it so that it flows around the memory metal alloy in a mold, and cooling the material to harden it to a solid with the memory metal embedded therein.

21. The method of claim 11, wherein the material is selected from the group consisting of non-ceramic glass, ceramic, plastic, and metal.

22. The method of claim 10, wherein opposed forces are applied to the longitudinally disparate ends of the memory metal alloy, directed generally in alignment with the longitudinal axis of the memory metal alloy, so as to stretch the memory metal alloy, increasing its tensile strength and decreasing its diameter, thereby enabling it to be pulled free of the material without breakage and without applying a load on the material.

23. The method of claim 11, wherein the memory metal alloy comprises a nitinol alloy.

* * * * *

UNITED STATES PATENT AND TRADEMARK OFFICE
CERTIFICATE OF CORRECTION

PATENT NO. : 5,013,507
DATED : May 7, 1991
INVENTOR(S) : Julien et al.

It is certified that error appears in the above-identified patent and that said Letters Patent is hereby corrected as shown below:

| Column | Line | |
|---|---|---|
| 6 | 47 | "not" should be --not-- |
| 9 | 31 | "service" should be --serving-- |

Signed and Sealed this

Ninth Day of February, 1993

Attest:

STEPHEN G. KUNIN

Attesting Officer

Acting Commissioner of Patents and Trademarks